United States Patent
Valley et al.

(10) Patent No.: US 8,120,334 B2
(45) Date of Patent: Feb. 21, 2012

(54) SYSTEM AND METHOD FOR PHASE MANAGEMENT IN A MULTIPHASE SWITCHING POWER SUPPLY

(75) Inventors: Richard L. Valley, Nashua, NH (US); Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 277 days.

(21) Appl. No.: 11/799,190

(22) Filed: May 1, 2007

(65) Prior Publication Data

US 2007/0262756 A1    Nov. 15, 2007

Related U.S. Application Data

(60) Provisional application No. 60/796,420, filed on May 1, 2006.

(51) Int. Cl.
*G05F 1/00* (2006.01)
(52) U.S. Cl. ..................................... 323/222
(58) Field of Classification Search .................. 323/222, 323/234, 237, 272, 282, 284, 299
See application file for complete search history.

(56) References Cited

U.S. PATENT DOCUMENTS

| | | | | |
|---|---|---|---|---|
| 3,767,998 A * | 10/1973 | Beling | | 363/45 |
| 4,245,185 A * | 1/1981 | Mitchell et al. | | 323/235 |
| 4,479,160 A * | 10/1984 | Stacey | | 361/76 |
| 5,793,191 A | 8/1998 | Elmore et al. | | |
| 6,495,995 B2 * | 12/2002 | Groom et al. | | 323/283 |
| 6,744,647 B2 * | 6/2004 | Cohen | | 363/71 |
| 6,771,052 B2 * | 8/2004 | Ostojic | | 323/266 |
| 6,906,536 B2 * | 6/2005 | Pearce et al. | | 324/713 |
| 6,922,044 B2 * | 7/2005 | Walters et al. | | 323/288 |
| 6,995,548 B2 * | 2/2006 | Walters et al. | | 323/272 |
| 7,085,116 B2 * | 8/2006 | Kudo et al. | | 361/93.6 |
| 7,173,400 B2 * | 2/2007 | Morioka | | 323/266 |
| 7,218,494 B2 * | 5/2007 | Kudo et al. | | 361/93.1 |
| 7,265,522 B2 * | 9/2007 | Sutardja et al. | | 323/222 |
| 7,282,896 B2 * | 10/2007 | Moussaoui et al. | | 323/272 |
| 7,282,897 B2 * | 10/2007 | Moussaoui et al. | | 323/272 |
| 7,453,248 B2 | 11/2008 | Takeuchi | | |
| 7,489,532 B2 | 2/2009 | Shih | | |

(Continued)

OTHER PUBLICATIONS

Infineon Technologies, CCM-PFC, ICE1PCS01, *Standalone Power Factor Correction (PFC) Controller in Continuous Conduction Mode (CCM)*, Datasheet, V1.3, Feb. 6, 2007.

(Continued)

*Primary Examiner* — Adolf Berhane
*Assistant Examiner* — Yemane Mehari
(74) *Attorney, Agent, or Firm* — William B. Kempler; Wade J. Brady, III; Frederick J. Telecky, Jr.

(57) ABSTRACT

A system and method for managing phases in a multiphase switching power supply turns off a phase in light load conditions and turns on a phase in heavier load conditions. The increase or decrease in the number of phases changes the efficiency of the power supply in response to operating conditions. The phases of the power supply may be synchronized and interleaved. Input current or power representing power supply loading provides a criteria for switching phases on or off. The input current can be taken from an input current sense resistor. The input power can be determined based on a control for managing phases. Turning a phase off causes remaining phases to have an increased on-time or gain to smooth the transition between differing numbers of active phases.

18 Claims, 5 Drawing Sheets

U.S. PATENT DOCUMENTS

2007/0057655 A1* 3/2007 Nishida .......................... 323/282
2007/0262756 A1* 11/2007 Valley et al. .................. 323/234

OTHER PUBLICATIONS

On Semiconductor Publication NCP1601A, NCP1601B, *Compact Fixed Frequency Discontinuous or Critical Conduction Voltage Mode Power Factor Correction Controller*, Semiconductor Components Industries, LLC, Dec. 2005.

ST, L6563, *Advanced transition-mode PFC controller*, STMicroelectronics, Mar. 2007.

Fairchild Semiconductor Corporation, Application Note AN-6026, *Design of Power Factor Correction Circuit Using FAN7529*, Oct. 16, 2006.

Office Action from U.S. Appl. No. 12/228,744 mailed Oct. 28, 2010.

* cited by examiner

SYSTEM AND METHOD FOR PHASE MANAGEMENT IN A MULTIPHASE SWITCHING POWER SUPPLY

CROSS REFERENCE TO RELATED APPLICATIONS

This application is based on and claims benefit of U.S. Provisional Application No. 60/796,420, filed May 1, 2006. This application is related to U.S. application Ser. No. 11/799, 352 (TI-61712) filed May 1, 2007, U.S. application Ser. No. 11/799,181 (TI-63508) filed May 1, 2007, and U.S. application Ser. No. 11/708,820 (TI-62124) filed Feb. 21, 2007.

STATEMENT REGARDING FEDERALLY SPONSORED RESEARCH OR DEVELOPMENT

Not Applicable

BACKGROUND OF THE INVENTION

1. Field of the Invention

The present invention relates generally to multiple power converters used in conjunction, and relates more particularly to a system and method for managing power converters used in conjunction as paralleled phases of a multiphase switching power supply.

2. Description of Related Art

Power supplies are often paralleled to meet particular application goals, such as current or power specifications. Performance improvements in interleaved, multiphase power supplies can be seen from advantages such as reduced input current ripple, reduced peak output current and greater frequency output ripple current. The higher frequency output ripple current permits easier filtering of the output ripple current to remove the ripple. Multiple interleaved phases in switching power supplies also tends to improve power conversion efficiency. A particular type of multiphase switching power supply has a variable switching frequency to obtain desired power supply output characteristics.

A variable frequency switching power supply may operate in various modes at various times, depending upon desired characteristics. For example, a switching power supply may operate in continuous, discontinuous or transition mode, each of which have various advantages. A switching power supply may be constructed to have an inductor that is supplied with current for a given interval and permitted to discharge to a certain extent. Such a switching power supply operating in a continuous mode permits an inductor to discharge to a point where the inductor current is still positive, or above zero, before charging the inductor again. A discontinuous mode switching power supply permits the current in the inductor to drop and remain at zero for a finite time before charging the output inductor again in a subsequent switching cycle. A transition mode switching power supply permits the inductor to discharge to zero current, at which point a new charging cycle begins, so that the inductor current is prevented from becoming negative or remaining zero.

One advantage to transition mode operation is the potential for zero voltage and/or zero current switching in the power supply. Zero voltage switching and zero current switching permits switching losses to be reduced, which can be especially advantageous at high frequencies that are often seen at light loads.

Another advantage to transition mode operation is that it provides a simple way to maintain a desired power factor for a power converter. A typical transition mode configuration for a power converter permits the current in the inductor to achieve a peak value that is proportional to the input voltage. The momentary average of the current through the inductor is proportional to the instantaneous value of the input voltage, which permits the power converter to draw power from an input source at unity power factor. It is desirable to maintain the power factor as close as possible to unity, so that the power converter appears as a purely resistive load on the input power line. Factors that contribute to improving the power factor include maintaining input voltage in phase with input current, and maintaining the input current as a sinusoid when the input voltage is a sinusoid. Transition mode operation tends to help support realization of a good power factor in a variable frequency switching power supply.

A variable frequency transition mode power converter constructed with an inductor can be viewed as a free running oscillator with the switching frequency being controlled by the amplitude of the inductor current. As the load demand decreases, the switching frequency tends to increase as inductor current amplitude decreases. Two or more transition mode power converters may be paralleled to obtain desired operating characteristics, such as a desired output current or power level. The paralleled power converters may also be interleaved and their waveforms synchronized to obtain the advantages discussed above. As switching frequency increases in a paralleled, interleaved power converter during light load conditions, the efficiency of the power converter decreases substantially. The switching losses experienced by the paralleled, interleaved power converters during high frequency switching tend to dominate converter losses over conduction losses. A number of applications for paralleled, or multiphase power converters have loads that can vary significantly, with light load demand extending over relatively long periods of time. It would be desirable to improve the efficiency of multiphase power converters during light load demand intervals.

SUMMARY OF THE INVENTION

An exemplary embodiment of the present invention provides a system and method for managing phases in a multiphase switching power supply. One or more phases in the multiphase power supply are dropped or turned off to reduce the number of active phases supplying power to the power supply output during light load conditions. Similarly, one or more phases in the multiphase power supply are added or turned on to increase the number of active phases supplying power to the power supply during heavy load conditions. The increase or decrease in the number of phases changes the efficiency of the power supply in response to operating conditions.

In an exemplary embodiment, the criteria for turning a phase on or off is based on input power. A control signal realized through a feedback loop provides a voltage that is generally proportional to a power level in the power supply. Alternately, or in addition, a current measure may be taken from current input into power components of the power supply to determine when a phase is to be turned on or off.

According to a feature of the present invention, a phase turn off causes the remaining active phase(s) to be modified to have a greater on-time or gain to produce the same output power as before the phase turnoff. The change in on-time or gain for remaining active phases occurs rapidly in response to phase turnoff. The use of a phase turn off event to cause the change in on-time or gain avoids delays that can occur if a feedback from the overall power supply control loop were used to cause the change.

The phases can be any type of power supply, and may be interleaved and synchronized to obtain the benefits of interleaved multiphase operation. Any number of phases may be employed, and the increase or decrease in number of phases may result in no active phases or a maximum number of phases. The various phases may have different inherent frequencies, the waveforms of which can be synchronized to a given common, or average, frequency.

DETAILED DESCRIPTION OF THE INVENTION

This application claims the benefit of U.S. Provisional Application No. 60/796,420, filed May 1, 2006, the entire content of which is hereby incorporated herein by reference.

Figure 1A:
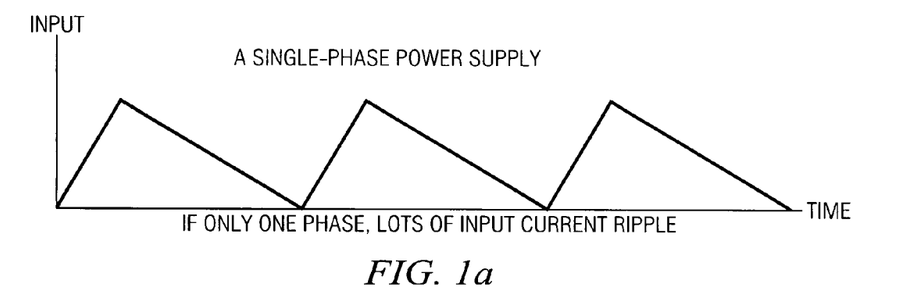
FIGS. 1a-1d are a set of graphs illustrating interleaved multiple phase power supply operation.
Figure 1B:
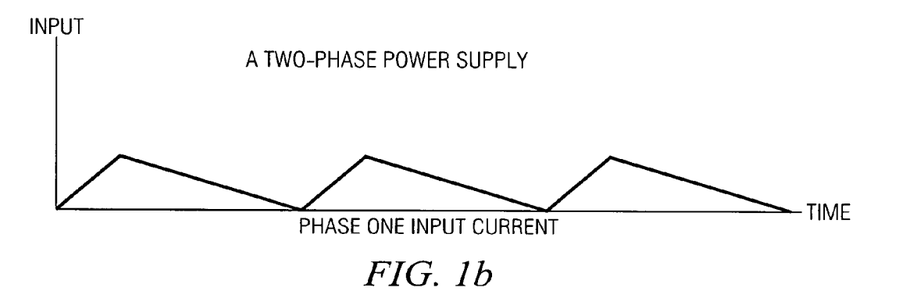
Figure 1C:
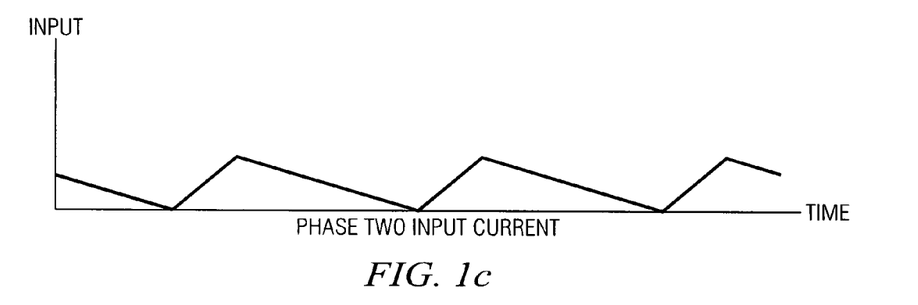
Figure 1D:
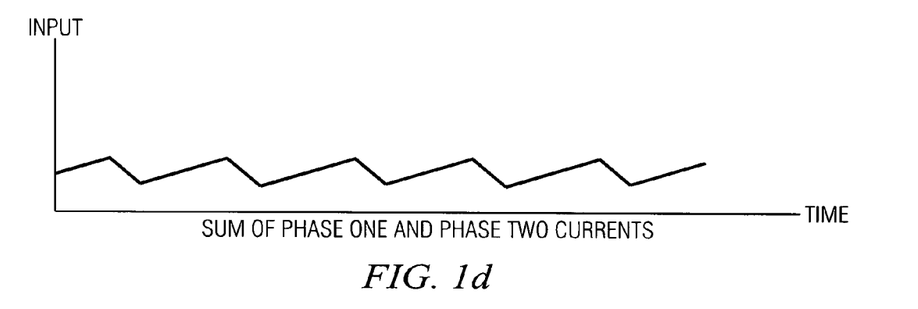

Referring to FIGS. 1a-1d, plots of input current verses time are illustrated for a single phase power supply and a power supply with two interleaved phases. FIG. 1a illustrates a single phase power supply that exhibits a significant amount of input current ripple. FIGS. 1b-1d illustrate input current for each of two phases, and the sum of the current of the two phases, respectively. The sum of the two current phases shown in FIG. 1d produces a current with lower peak current, lower ripple, and a ripple frequency that is twice the frequency of the two input current phases. A variable frequency PWM control may be used to produce an interleaved multiphase power supply with such an advantageous summed current. However, the realization of the variable frequency PWM control is somewhat challenging in that properly synchronizing the separate phases can be difficult when the phases vary in frequency.

Figure 2A:
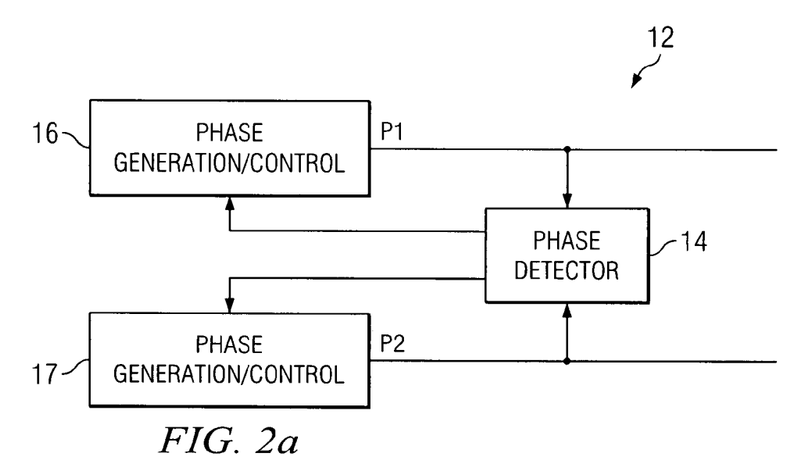
FIGS. 2a-2b are block diagrams illustrating paralleled power converters.

Referring to FIG. 2a, an abstract block diagram of an interleaved multiphase power converter 12 is illustrated. Power converter 12 includes two phases, P1 and P2, that have periodic waveforms controlled to have a phase difference of 180°. A phase detector 14 inspects the waveforms of phases P1 and P2 and provides relative phase information to phase generation/control components 16, 17. Phase detector 14 provides a relative phase measure to each component 16, 17, based on phase information derived from an alternate phase. Accordingly, phase detector 14 inspects the periodic waveform of phase P2 to provide phase information to component 16, and inspects the periodic waveform of phase P1 to provide phase information to component 17. Each of components 16, 17 modify phases P1 and P2, respectively, based on the phase information provided by phase detector 14. As each of components 16, 17 modify their respective phases P1, P2, phase detector 14 provides further relative phase information feedback, thereby providing a closed loop relative phase angle difference control.

The periodic waveforms in phases P1, P2 may be power signals that are interleaved to produce a summed output with reduced peak current, reduced ripple, and higher frequency ripple. Alternately, the periodic waveforms in phases P1 and P2 can be control signals provided to power components that produce period power waveforms. In the exemplary configuration illustrated in FIG. 2a, a single phase detector 14 is provided for two phases P1 and P2. The configuration of FIG. 2a is a special case of the present invention involving two phases, the periodic waveforms of which are separated by 180°.

Figure 2B:
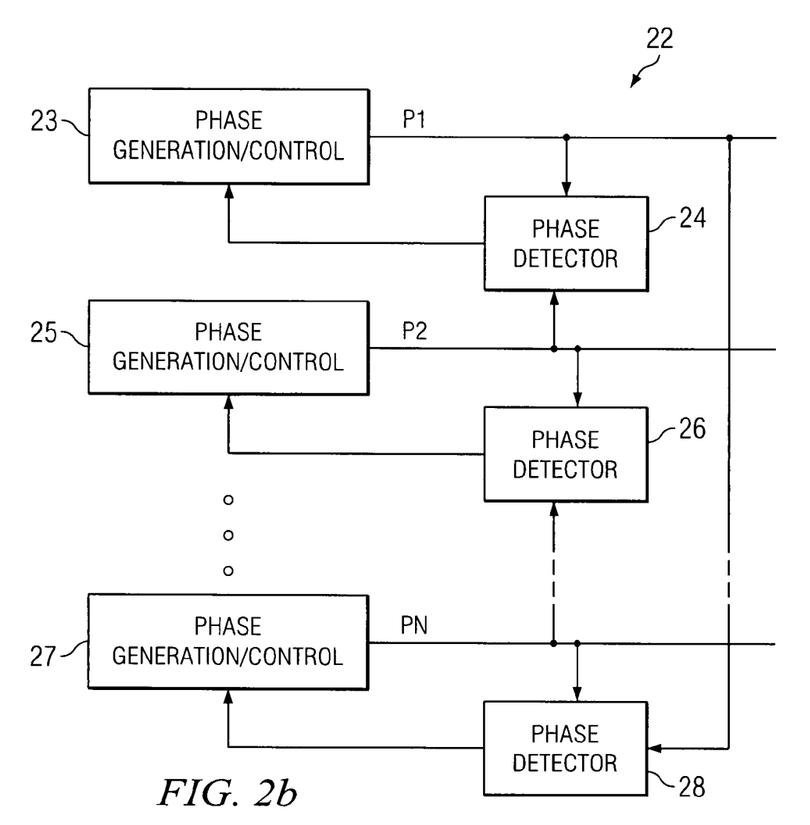

Referring now to FIG. 2b, a generalized multiphase interleaved power converter 22 is illustrated. Power converter 22 has a general number of phases N, denoted as phases P1-PN. Phase generation/control components 23, 25 and 27 generate periodic waveforms in each of phases P1, P2 and PN, respectively. Phases P1-PN can be combinations of signals for controlling power components to generate periodic power waveforms or the periodic power waveforms themselves. In the general case illustrated in FIG. 2b, there is a phase detector for each phase in power converter 22. The feedback provided by phase detectors 24, 26 and 28 each depend upon two phases to obtain a relative phase measure. Accordingly, the phase information that is received by each phase detector 24, 26 and 28 is used to obtain a feedback signal to control the generation of a respective phase P1-PN to have a desired phase angle separation between the periodic waveforms of phases P1-PN. Accordingly, the control of the periodic waveform in each phase P1-PN depends upon a phase angle measurement from two different phases. When any of phase detectors 24, 26 or 28 detect a phase angle difference error, a correction to reduce the error propagates through components 23, 25 and 27 to adjust relative phase angle difference until the error is reduced for all phases. The propagation of the error through the phases synchronizes the periodic waveforms in each phase to have an overall desired phase angle separation between each phase. By synchronizing the period waveforms, the operating frequencies of phases P1-PN tend towards a single frequency, so that phases P1-PN is operate at a given frequency. The given frequency tends to be an average of the different independent frequencies of phases P1-PN.

Phases P1-PN can be in any temporal order with respect to leading or lagging. That is, phases P1-PN can be arranged so that phase P2 lags P1 and phase PN lags P2. Alternately, phases P1-PN can be arranged so that phase P1 lags P2 or PN or both. The phase detectors 24, 26 and 28 are arranged to detect the desired relative phase difference in accordance with the temporal order in which phases P1-PN are arranged.

Figure 3:
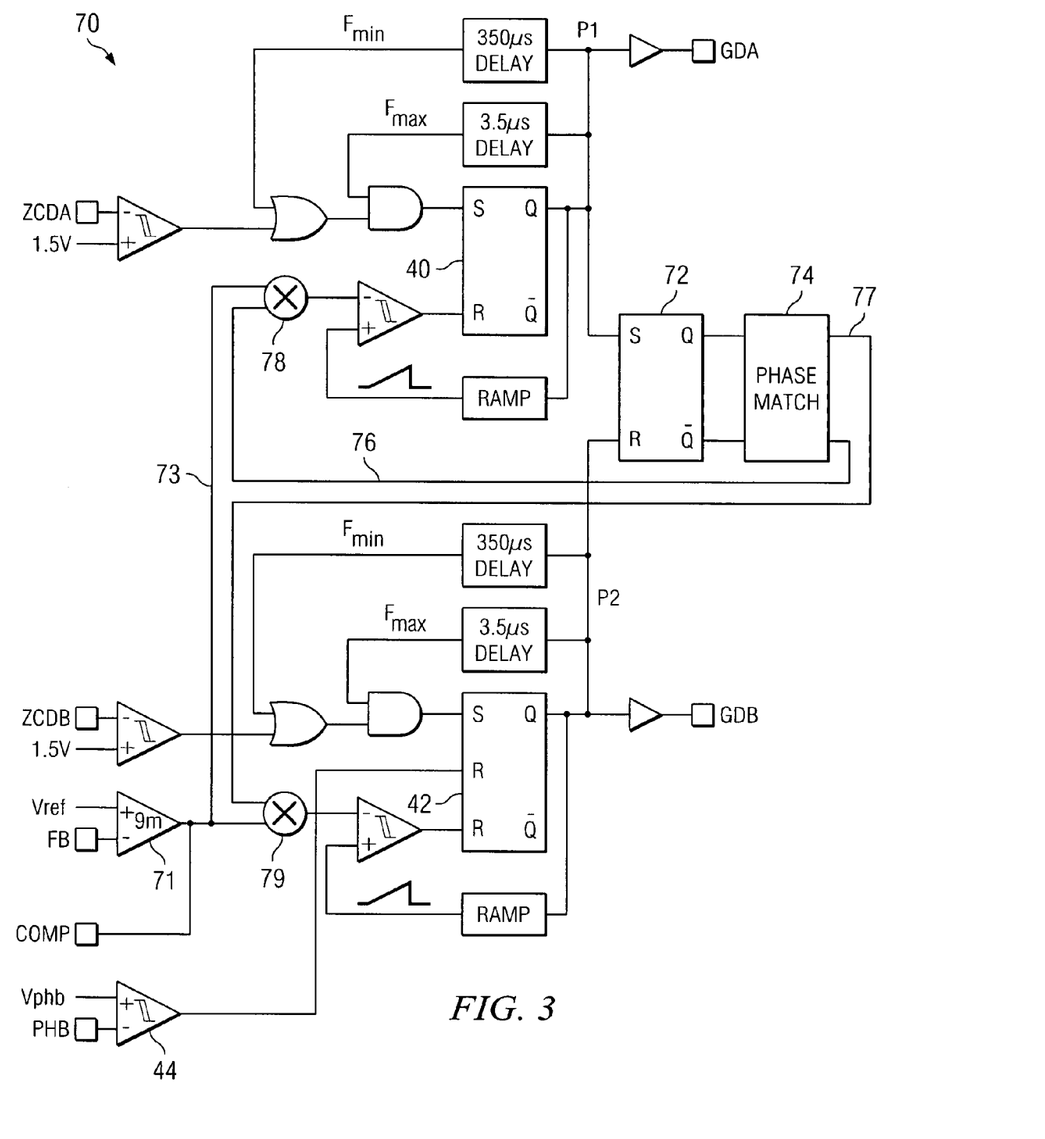
FIG. 3 is a circuit block diagram of a two-phase embodiment in accordance with the present invention.

Referring now to FIG. 3, an exemplary embodiment of a control circuit 70 according to the present disclosure is illustrated. In this embodiment, the control signals used to drive the power switches of two separate phases P1 and P2 also drive an edge triggered flip-flop 72. The outputs of edge triggered flip-flop 72 are applied to a control loop filter 74. Control loop filter 74 provides a phase matching function to provide error signals 76,77 that adjust the separation of phases P1,P2 to track with each other and maintain a desired phase separation. In the two phase example in FIG. 3, the periodic waveforms in phases P1,P2 are maintained to have a 180° phase angle difference.

The periodic waveforms in phases P1 and P2 are PWM signals that drive power switches used to provide periodic power signals that are interleaved to obtain the advantages of an interleaved, paralleled power supply discussed above. The gate drives are provided through points GDA and GDB based on phases P1 and P2, respectively. The periodic signals in phases P1 and P2 are applied to an edge-triggered flip-flop 72, so that flip-flop 72 receives phase difference information depending upon how the set and reset inputs of flip-flop 72 are activated. The outputs of flip-flop 72 maintain the respective S and R edge-triggered states until reset or set, respectively, by edge-triggered inputs on an alternate input of flip-flop 72. Accordingly, the desired shape of the outputs of flip-flop 72 are complementary, 50% duty cycle PWM signals. If one or both of the outputs of flip-flop 72 drift away from the complementary, 50% duty cycle relationship, that is, if the outputs of flip-flop 72 do not maintain a 180° phase angle separation, the error is detected and fed back to the appropriate phase control to appropriately advance or retard the respective phase angle. Control loop filter 74 provides logic and signaling to generate an appropriate error signal 76,77, for each phase. Error signals 76,77 are applied to multipliers 78,79, respectively, to amplify error signals 76,77 on the basis of a feedback error voltage FB in conjunction with an operating reference voltage Vref applied to an amplifier 71. The output of amplifier 71, as optionally compensated through input COMP, provides a closed loop reference signal with an overall error component for controlling a power output of the overall interleaved multi-phased power supply.

A control signal 73 provides a control voltage that acts as a threshold to cause a reset in each of phases P1,P2, which causes the gate drive signals provided to outputs GDA and GDB to go to a logic low level. The threshold is provided as a ramp that causes a reset in phases P1 or P2 when the output of multipliers 78,79 exceed the associated ramp values for their respective phases. The ramp signals for each respective phase restart each time an associated phase P1 or P2 rises to a logic high level. The outputs of flip-flops 40,42 are turned off when the associated ramp reaches a threshold level set by the output of amplifier 71 multiplied by error signals 76 or 77. Accordingly, the appropriate error signal 76,77 influences the respective phase control loop error signal provided by amplifier 71. Error signals 76,77 cause control signal 73 to be increased or decreased to reach a threshold established by the ramp signals in each phase at different times. Flip-flops 76,77 are thus reset at a desired time to obtain an adjustment for a phase angle difference between phases P1 and P2. For example, if the phase angle difference between phases P1 and P2 is greater than 180°, error signal 76 has a decreased value to decrease the output of multiplier 78 to extend the amount of time needed to meet the threshold established by the ramp in phase P1. Accordingly, a reset of phase P1 is slightly delayed permitting the period of a pulse in phase P1 to be extended, thereby decreasing the phase angle difference between phases P1 and P2 toward 180°. Error signal 76 is similarly increased to retard phase P1 if the phase angle difference between phases P1 and P2 is less than 180°. Error signal 77 operates similarly with respect to phase P2 to retard or advance phase P2 by lengthening or shortening the period of the pulse in phase P2.

Control circuit 70 also includes a comparator 44 that is set to determine when the number of active phases should be increased or decreased. Compare 44 includes a threshold voltage Vphb that indicates when a phase switch should occur. An input PHB is applied to the inverting input of comparator 44 to signal a low-power or light load condition to indicate a reduction in the number of active phases. Accordingly, when input PHB drops below voltage Vphb, the output of comparator 44 transitions from a logic low level to a logic high level. The output of comparator 44 is applied to a reset input of flip-flop 42, causing the normal output of flip-flop 42 to be driven to a logic low level. By driving the normal output of flip-flop 42 to a logic low level, phase P2 is turned off.

Phase P2 remains disabled while input PHB remains below voltage Vphb. If the demand on the power supply increases, such that the signal applied to input PHB increases above voltage Vphb, the output of comparator 44 is driven to a logic low level, which de-asserts the reset applied to a 42, permitting phase P2 to be operated once again.

Control signal 73 provides a control voltage, derived from the output of trans-conductance amplifier 71 and a compensation network optionally applied on a compensation input COMP. The optional compensation network on input COMP is connected between an output of amplifier 71 and ground, so that control signal 73 is compensated based on system characteristics and desired performance, for example. A feedback voltage applied to input FB provides a frequency control for power supply 70.

In accordance with an exemplary embodiment of the present invention, a compensation network is provide between input COMP and ground to provide compensation for the loop gain contributed by amplifier 71 and the remainder of the regulation loop. The operating level at input comp is thus generally proportional to the power level through the power supply. Inputs COMP and PHB are tied together, so that phase management of phases P1, P2 depends in part on control signal 73. When input PHB is connected to input COMP, a transition criteria for switching between single and dual phase operation becomes generally proportional to input power. That is, control signal 73 applied to input PHB causes switching between a single active phase and two active phases to be based on input current and input voltage. When input power decreases to level represented by voltage Vphb, phase P2 is turned off and phase P1 remains active, thereby increasing the efficiency of power supply 70 at increased switching frequency operation associated with light loads.

Figure 4:
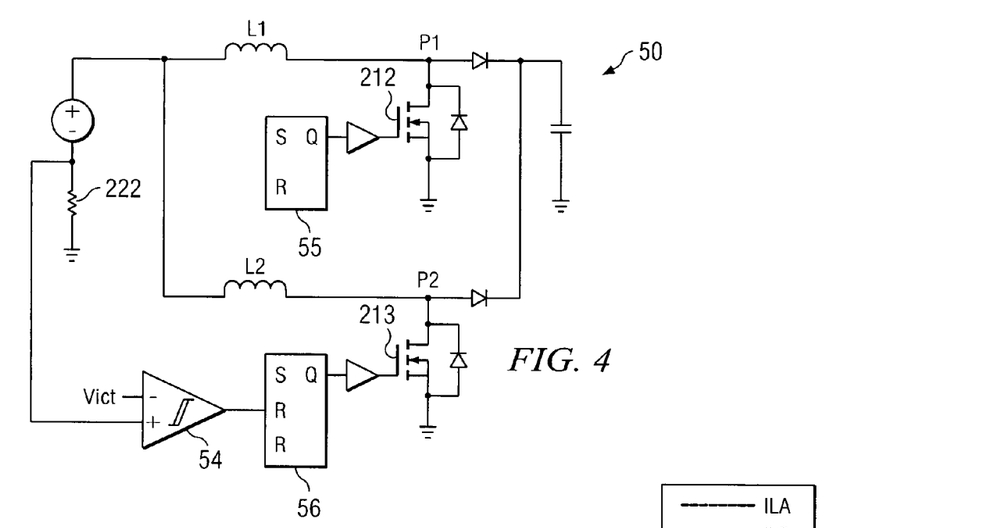
FIG. 4 is a circuit block diagram of a two-phase embodiment in accordance with the present invention.

Referring now to FIG. 4, another exemplary embodiment for managing phases in a multiphase power supply 50 is illustrated. A shunt resistor 222 is coupled to the input current of the power supply 50. The input current corresponds to a sum of the currents in inductors L1 and L2. Accordingly, the voltage across resistor 222 represents the sum of the currents in inductors L1 and L2, and can be used to determine a control for turning phases on or off during heavy or light loads.

The use of input current to determine a low-power condition for turning off phase P2, for example, represents an improvement in performance for responding to low demand conditions. For example, the input current measure provided by shunt resistor 222 is continuous and cumulative. Prior current measures in power equipment often depended on measuring output current through a switch, which provided little or no current information when the switch was off. Accordingly, such prior measurements were not continuous, and were specific to a switch or phase rather than overall power supply operation.

The voltage across shunt resistor 222 is a negative voltage value, which is applied to the non-inverting input of comparator 54, which can be implemented as comparator 44 shown in FIG. 3. Comparator 54 has a negative reference voltage $V_{ICT}$ applied to the inverting input to act as a threshold for turning phase P2 on or off. When input current decreases, the magnitude of the voltage on shunt resistor 222 also decreases, that is, it becomes more positive. As the magnitude of the voltage applied the non-inverting input of comparator 54 decreases, it becomes more positive than negative reference voltage $V_{ICT}$. When the voltage from shunt resistor 222 crosses the threshold represented by negative reference voltage $V_{ICT}$, comparator 54 produces a logic high output. The logic high output resets flip-flop 56, which causes phase P2 to be turned off.

If the load demand on power supply 50 increases, the input current through shunt resistor 222 increases, producing an increased magnitude negative voltage applied to comparator 54. As the negative voltage across shunt resistor 222 increases in magnitude, that is, becomes more negative, it crosses the threshold represented by negative reference voltage $V_{ICT}$. The output of comparator 54 then transitions to a logic low level. The logic low level output applied the reset input of flip-flop 56 permits flip-flop 56 to become active and cause switch 213 to switch, reactivating phase P2.

The power supplies illustrated in FIGS. 3 and 4 make the gain adjustments to the active phase to accommodate turning a phase on or off. For example, in light load conditions, if phase P2 is turned off, the on time for phase P1 is approximately doubled. Similarly, as load demand increases, and phase P2 is reactivated after having been turned off, the on-time for phase P1 is decreased to approximately half. The changes in gain made to phase P1, for example, are initiated once a determination is made to turn phase P2 on or off. That is, the gain change applied to phase P1 occurs as soon as phase P2 is turned on or off. This rapid change in gain avoids performance issues that may arise if the power supply were configured to have the closed loop gain control operate to change the gain in the phase P1. That is, the closed loop gain control of the power supplies illustrated in FIGS. 3 and 4 is typically set to respond relatively slowly to avoid the impact of high-frequency transients. By changing the gain of phase P1 directly, any performance issues with closed loop control are avoided.

Figure 5A:
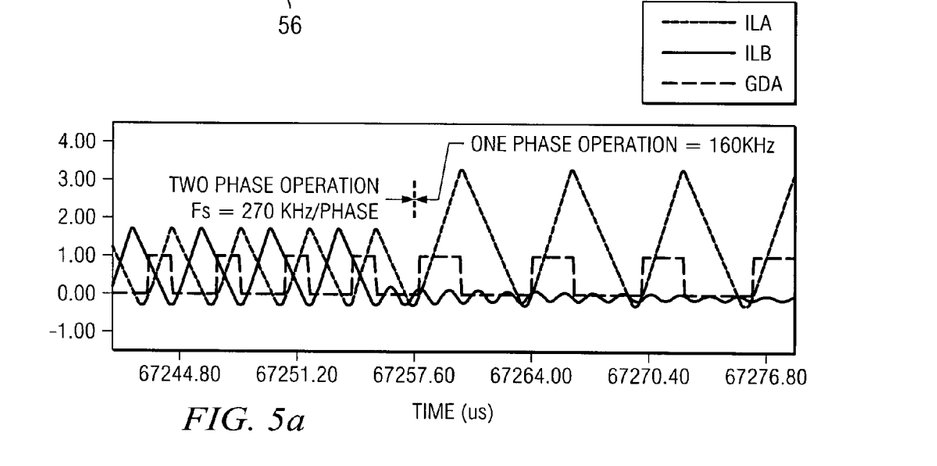
FIGS. 5a-5b are graphs illustrating current and voltage for a phase-managed PFC power converter.
Figure 5B:
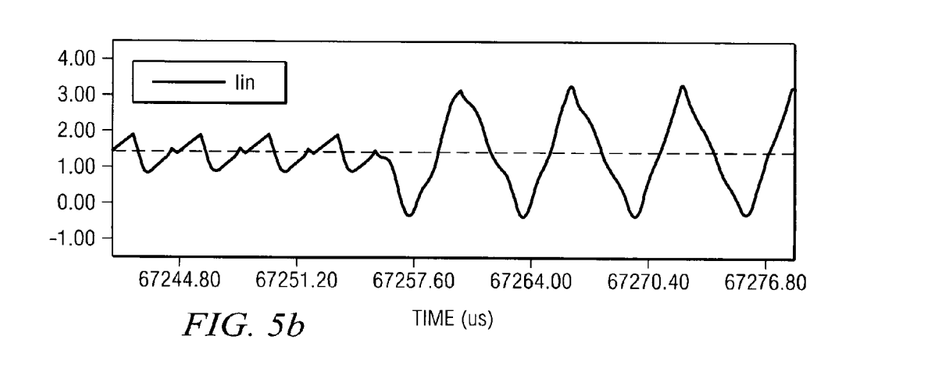
Figure 6:
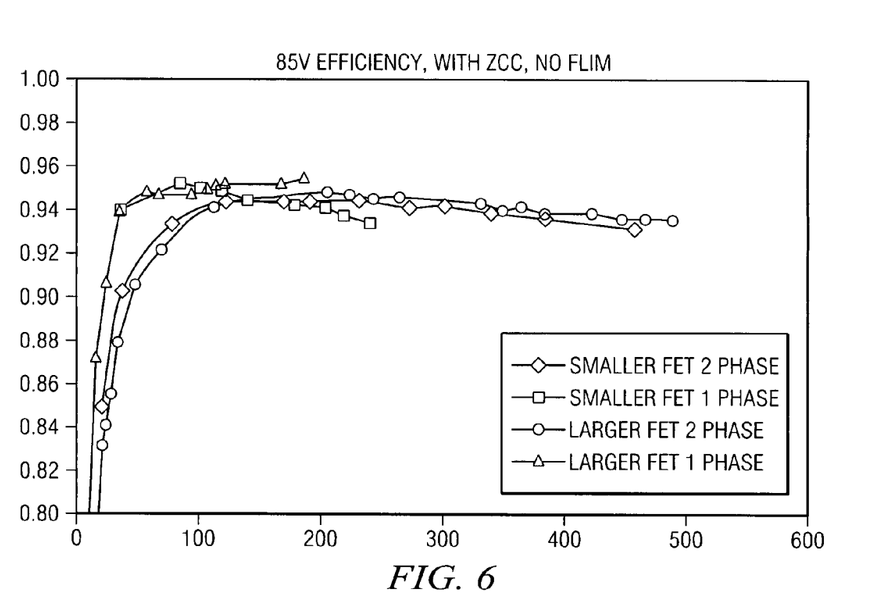
FIG. 6 is a graph illustrating efficiency versus output power for one- and two-phase operation.
Figure 7:
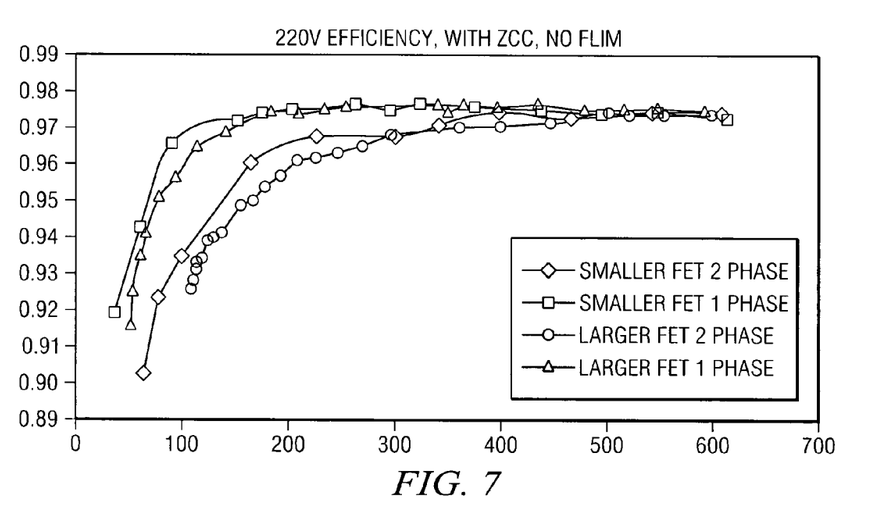
FIG. 7 is a graph illustrating efficiency versus output power for one- and two-phase operation.

Referring now to FIGS. 5-7, an illustration of operation of phase management for a multiphase interleaved power converter is provided. While interleaved multiphase operation for a power converter attains a number of advantages as discussed above, light load operation can incur significant switching losses as a result of high frequency switching and parasitic capacitances. In particular, in a transition mode boost power converter the switching frequency increases inversely with the load and with the square of the input line voltage RMS value. Other drawbacks may be observed with high frequency operation of transition mode boost converter with low current levels, such as increased line input current THD, unpredictable converter behavior and increased EMI. In accordance with an exemplary embodiment of the present invention, a transition mode boost converter having multiple interleaved phases disables one or more phases to improve power conversion efficiency and overcome the above-mentioned drawbacks. In accordance with one embodiment, a dual-phase interleaved power converter transitions to single-phase operation to reduce switching losses through operation at lower switching frequency and higher peak current levels as described above. Single-phase operation contributes to overcoming the drawbacks of switching losses that dominate the power stage losses in comparison with conduction losses. FIGS. 6 and 7 illustrate efficiency in single-phase operation at light loads at various operating power levels. As can be seen, the efficiency of operation in waveforms B and D is significantly improved at lower power ranges in comparison with waveforms A and C that reflect two-phase operation.

In operation, one phase of two-phase interleaved transition mode boost power converter is disabled. At the same time, the circuit controlling the on-time for the boost switch of the remaining phase increases the on-time by a factor of approximately 2. The increase in on-time for the remaining boost contributes to smoothing a transition between single and two-phase operation. The peak current is accordingly increased in the boost inductor, and the effective switching frequency is similarly reduced. The lower switching frequency tends to decrease switching losses and improve overall power converter efficiency.

The switch over from two phase to single-phase operation can be provided as a user selectable feature to permit designers to choose a point for phase change-over in relation to switching losses versus the advantages of multi-phased interleaved power conversion. Alternately, or in addition, the point at which phase change-over from two phases to one phase occurs can be set internally or tied to other control signals related to power converter loop control and operational efficiency as described above.

In accordance with an exemplary embodiment of the present invention, a phase change-over to reduce the number of active phases in a multi-phased interleaved power converter is determined based on input current information. The determination of the number of active phases based on input current uses efficiency curves versus input current based on the number of active phases. The efficiency curves may be measured or calculated. Phase activation versus input current may be calibrated with the efficiency curves to obtain a maximum efficiency by selecting the number of active phases based on the given input current. The use of input current information to select the number of active phases to increase efficiency provides better performance and a simpler design than previous solutions that rely on power converter output current determinations. One reason the input current information produced better phase management for improved efficiency is that input current more accurately reflects current transferred in the power converter than typical prior output current measurements. Previous output current measures typically rely on a current measure taken through power switches, which, because they are not always conducting, do not always give information about phase current. Measurement of input current contributes to providing a more consistent view of current flows in the power converter than might otherwise be achieved by inspecting the current flows through the power switches. By determining appropriate levels of input current information for selecting a desired number of active phases, the efficiency of the transition mode boost power converter can achieve greater levels of efficiency and an optimal number of phases being active for a given load and input.

The concept of phase management is not limited to a multiphase interleaved power converter, but can also be used in other power delivery configurations that include multiple power converters. For example, power converters may be connected in parallel to deliver a specified amount of current to a load for a given application. In the event that the load demand drops to a given level, it is desirable to turn off one of the parallel power converters to improve efficiency. The decision on the number of parallel power converters to maintain an active operation, and when a change-over of the number of active parallel power converters should occur is based on input current information in accordance with the present invention. Accordingly, the determination of a number of active power converters arranged in parallel based on input current to improve overall power delivery efficiency is considered to be within the scope of the inventive features of the present disclosure.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A multiphase power supply with two or more phases, the power supply comprising:
   a phase controller for each phase operable to control power generation in each phase;
   a switching device coupled to a phase controller and configured to turn the phase controller on or off, thereby turning a respective phase on or off, and having an input for receiving an indication of power supply loading;
   the switching device being operable to turn the phase controller off when the indication has a value related to power supply loading being less than a predetermined value, and being operable to turn the phase controller on when the indication has a value related to power supply loading being greater than the predetermined value, whereby, during times when power supply loading is less than a predetermined value, at least one phase is turned off; and
   a current sensitive device coupled to the input and operable to provide a measure of power supply input current as the indication.

2. The power supply according to claim 1, wherein the current sensitive device is a resistor connected to a node in series with the two or more phases.

3. the power supply according to claim 1, further comprising an amplifier coupled to a power supply feedback and operable to provide a measure of a power level in the power supply as the indication.

4. The power supply according to claim 1, wherein each phase controller includes a switch coupled to an energy storage device, wherein operation of the switch permits energy to flow into or out of the energy storage device at periodic intervals.

5. The power supply according to claim 4, further comprising:
   a synchronization device coupled between two phases and operable to sense a phase angle difference between the two phases; and
   at least two outputs from the synchronization device, each output being coupled to a respective phase controller for each of the two phases and being operable to influence the respective phase controller to operate a respective switch to obtain a predetermined phase angle difference between the two phases.

6. The power supply according to claim 1, further comprising:
   an on-time controller coupled to another phase controller for determining an on-time of a switch in the another phase controller; and
   the on-time controller being responsive to the switching device to increase an on-time of the switch when the switching device turns off the phase controller and to decrease an on-time of the switch when the switching device turns on the phase controller.

7. A power supply system, comprising:
   a plurality of parallel switching power converters having combined outputs;
   a signaling device coupled to one of the switching power converters and being operable to detect an input current of the power supply system and deactivate the one of the switching power converters when the input current is less than a predetermined value, whereby, during times when power supply loading is less than a predetermined value, at least one phase is turned off.

8. The power supply system according to claim 7, wherein the power converters are interleaved and synchronized to have a predetermined phase angle difference therebetween.

9. The power supply system according to claim 7, further comprising:
   an on-time controller in each switching power converter for determining an on-time of a switch in each switching power supply; and
   the on-time controller being responsive to the signaling device to increase an on-time of a switch in another switching power converter when the signaling device deactivates the one switching power converter.

10. The power supply system according to claim 9, wherein the increase in the on-time of the switch doubles the on-time when the power supply system has two switching power converters.

11. A method for managing efficiency of a multiphase power supply, comprising:
    controlling a switch in each phase of the power supply to turn on and off to control power generation in each phase;
    determining power supply loading comprising measuring input current; and
    turning off one or more phases in the power supply when the power supply loading becomes less than a predetermined value, whereby, during times when power supply loading is less than a predetermined value, at least one phase is turned off.

12. The method according to claim 11, further comprising turning on the one or more phases when the power supply loading becomes greater than the predetermined value.

13. The method according to claim 11, further comprising employing a resistor connected to a node coupled to all the phases to measure the input current.

14. The method according to claim 11, wherein determining power supply loading further comprises employing an amplifier coupled to a power supply feedback to measure a power level of the power supply.

15. The method according to claim 11, further comprising operating the switch in each phase to permit energy to flow into or out of an energy storage device at periodic intervals.

16. The method according to claim 15, further comprising:
    sensing a phase angle difference between two phases; and
    operating a respective switch in each of the two phases to obtain a predetermined phase angle difference between the two phases.

17. The method according to claim 11, further comprising increasing an on-time of a switch in another phase when the one or more phases are turned off.

18. The method according to claim 11, further comprising controlling the switch in each phase to have variable switching frequency.

* * * * *